US012081937B2

(12) United States Patent
Kato et al.

(10) Patent No.: US 12,081,937 B2
(45) Date of Patent: Sep. 3, 2024

(54) SOUND EMITTING APPARATUS

(71) Applicant: Yamaha Corporation, Hamamatsu (JP)

(72) Inventors: Shinichi Kato, Hamamatsu (JP); Yoshifumi Oizumi, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 190 days.

(21) Appl. No.: 17/733,193

(22) Filed: Apr. 29, 2022

(65) Prior Publication Data

US 2022/0264220 A1 Aug. 18, 2022

Related U.S. Application Data

(63) Continuation of application No. PCT/JP2020/040439, filed on Oct. 28, 2020.

(30) Foreign Application Priority Data

Oct. 31, 2019 (JP) ................................ 2019-199229
Oct. 31, 2019 (JP) ................................ 2019-199230

(51) Int. Cl.

*H04R 1/28* (2006.01)
*H04R 1/02* (2006.01)
*H04R 1/32* (2006.01)

(52) U.S. Cl.

CPC ........... *H04R 1/2826* (2013.01); *H04R 1/025* (2013.01); *H04R 1/026* (2013.01); *H04R 1/288* (2013.01); *H04R 1/323* (2013.01); *H04R 2201/021* (2013.01)

(58) Field of Classification Search

CPC ...... H04R 1/2826; H04R 1/025; H04R 1/026; H04R 1/288; H04R 1/323; H04R 2201/021

USPC ........................................................ 381/338

See application file for complete search history.

(56) References Cited

U.S. PATENT DOCUMENTS

2013/0142373 A1 6/2013 Kanaya
2019/0149908 A1* 5/2019 Kim .................... H04R 1/2826 381/388
2019/0200134 A1 6/2019 Shimada et al.
2020/0234687 A1* 7/2020 Ohtsu .................... F24F 13/24
2021/0012762 A1 1/2021 Ohtsu et al.
2021/0233505 A1* 7/2021 Hakuta ................ G10K 11/161

FOREIGN PATENT DOCUMENTS

JP 2005-210508 A 8/2005
JP 2007-208318 A 8/2007
JP 2010-91777 A 4/2010
JP 2011-154139 A 8/2011

(Continued)

OTHER PUBLICATIONS

Japanese-language Office Action issued in Japanese Application No. 2021-553654 dated Sep. 6, 2022 with English translation (10 pages).

(Continued)

*Primary Examiner* — Sean H Nguyen
(74) *Attorney, Agent, or Firm* — Crowell & Moring LLP

(57) ABSTRACT

A sound emitting apparatus includes a speaker unit and an enclosure of the speaker unit having an aperture configuring a Helmholtz resonator. A resonance frequency Fr of the Helmholtz resonator is set to be equal to or higher than a reproducible lower limit frequency of the speaker unit.

13 Claims, 22 Drawing Sheets

(56) References Cited

FOREIGN PATENT DOCUMENTS

| | | | |
|---|---|---|---|
| JP | 2013-093845 | A | 5/2013 |
| JP | 2013-162212 | A | 8/2013 |
| JP | 2014-3347 | A | 1/2014 |
| JP | 2019-114934 | A | 7/2019 |
| JP | 2019-161604 | A | 9/2019 |
| WO | WO 2019/203089 | A | 10/2019 |

OTHER PUBLICATIONS

FPS Inc., FPS Voice Security System Sound Masking, YouTube [online], Mar. 16, 2015 [retrieved on Nov. 16, 2020], Retrieved from the Internet: <URL: https://youtube.com/watch?v=ipOFWGaFDok>.

International Search Report (PCT/ISA/210) issued in PCT Application No. PCT/JP2020/040439 dated Jan. 12, 2021 with English translation (12 pages).

Japanese-language Written Opinion (PCT/ISA/237) issued in PCT Application No. PCT /JP2020/040439 dated Jan. 12, 2021 (eight (8) pages).

International Preliminary Report on Patentability (PCT/IB/338 & PCT/IB/373) issued in PCT Application No. PCT/JP2020/040439 dated May 3, 2022, including English translation of document C3 (Japanese-language Written Opinion (PCT/ISA/237), filed on Apr. 29, 2022) (10 pages).

* cited by examiner

SOUND EMITTING APPARATUS

CROSS REFERENCE TO RELATED APPLICATION

This application is a continuation of PCT Application No. PCT/JP2020/040439, filed on Oct. 28, 2020, which claims priority to Japanese Application No. 2019-199229, filed on Oct. 31, 2019, and Japanese Application No. 2019-199230, also filed on Oct. 31, 2019, the entirety of each of which is incorporated by reference herein.

BACKGROUND

Technical Field

An embodiment of the present disclosure relates to a sound emitting apparatus including a directional speaker.

Background Information

Japanese Unexamined Patent Application Publication No. 2019-114934 discloses a speaker structure including a bass reflex port as an example of a Helmholtz resonator.

In addition, Japanese Unexamined Patent Application Publication No. 2010-091777 discloses a hands free communication system with high secrecy by using a simple partition, in an environment such as a call center or an office. In the hands free communication system disclosed in Japanese Unexamined Patent Application Publication No. 2010-091777, a sound absorbing panel is provided at a position separated from the flat speaker in a sound emitting direction of the flat speaker.

The Helmholtz resonator disclosed in Japanese Unexamined Patent Application Publication No. 2019-114934 is a bass reflex port in order to reinforce a low-frequency sound component. The sound emitting direction of the flat speaker in Japanese Unexamined Patent Application Publication No. 2010-091777 extends outward from an individual space surrounded with the partition.

SUMMARY

According to embodiments of the present disclosure, a sound emitting apparatus includes a speaker unit and an enclosure of the speaker unit having an aperture configuring a Helmholtz resonator, and a resonance frequency Fr of the Helmholtz resonator is set to be equal to or higher than a reproducible lower limit frequency of the speaker unit.

According to an embodiment of the present disclosure, a low-frequency sound component that is easily diffracted in a direction other than a target direction is reduced, and thus sound leakage is significantly reduced compared to conventional cases.

DETAILED DESCRIPTION

Figure 1:
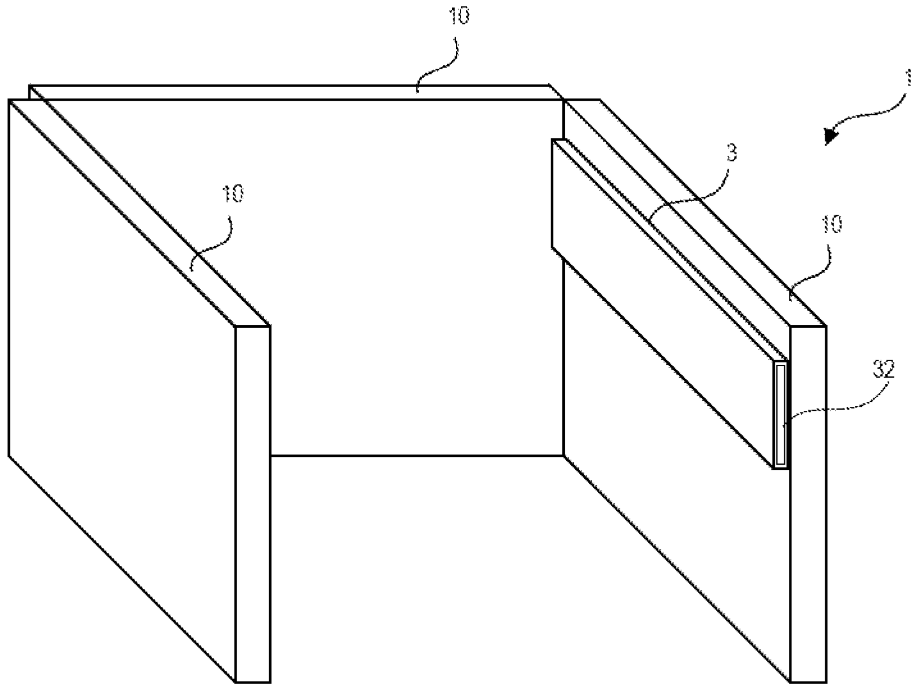
FIG. 1 is a perspective view showing a sound emitting apparatus 1.
Figure 2:
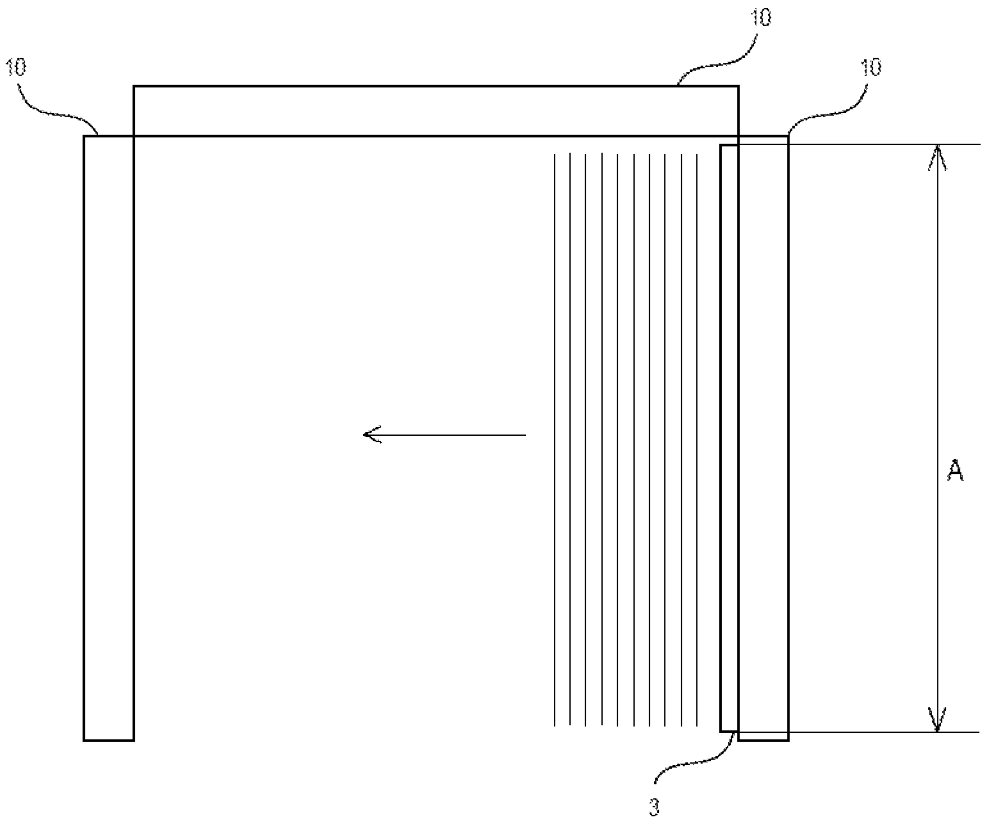
FIG. 2 is a plan view of the sound emitting apparatus 1.
Figure 3:
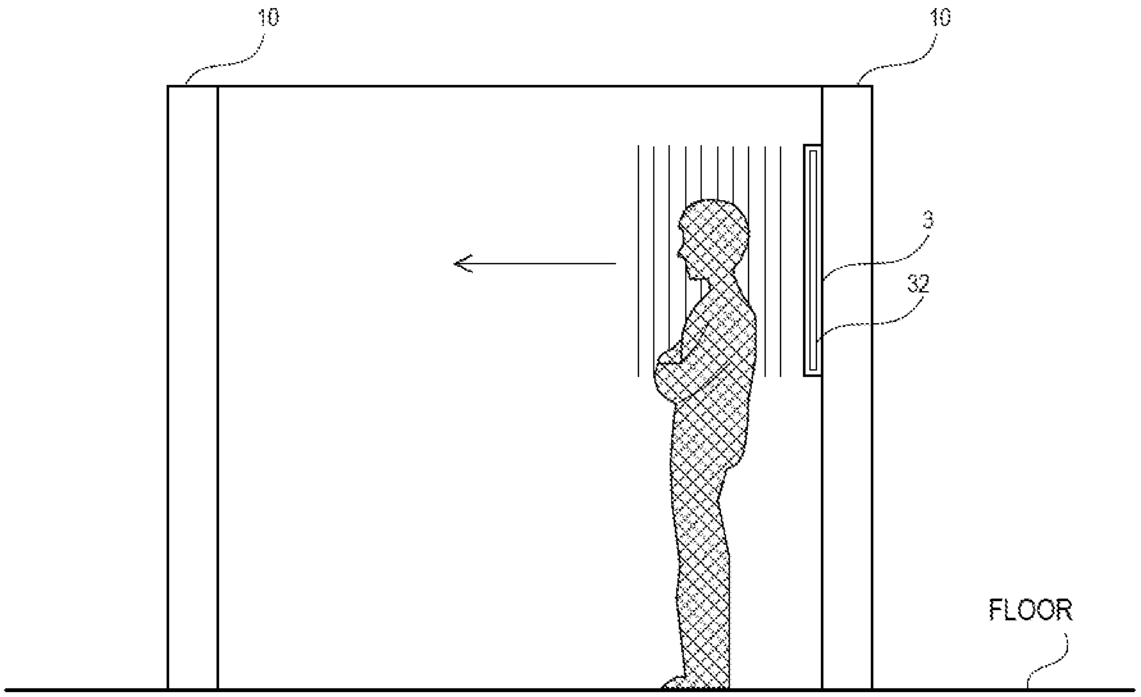
FIG. 3 is a front view of the sound emitting apparatus 1.
Figure 4:
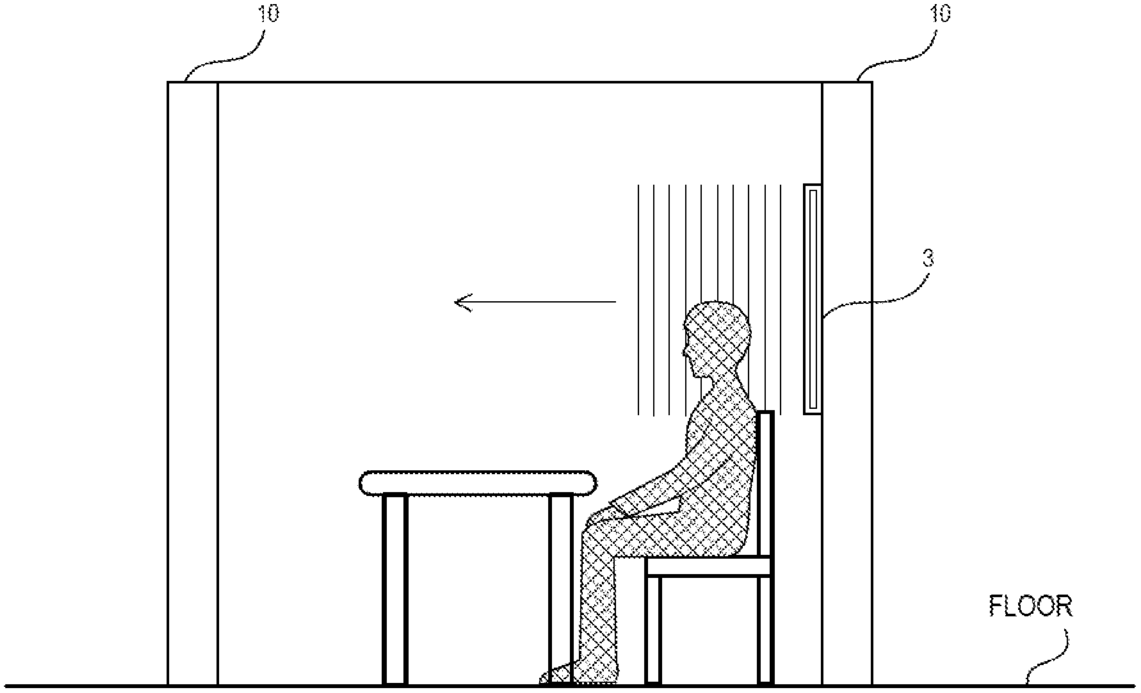
FIG. 4 is a front view of the sound emitting apparatus 1.

FIG. 1 is a perspective view showing a sound emitting apparatus 1 according to the present embodiment. FIG. 2 is a plan view. FIG. 3 and FIG. 4 are front views.

The sound emitting apparatus 1 includes a partition 10 and a flat speaker 3. The partition 10 is an example of a board material to configure a wall surface being an acoustic blocker of the present disclosure. The flat speaker 3 is an example of a directional speaker of the present disclosure.

The partition 10 is a component to define a semi-private room. The semi-private room includes an acoustically opened part and an acoustically blocked part, the acoustically blocked part being defined as an acoustic blocker. The wall surfaces of the partition 10 configure the acoustic blocker of the semi-private room. The wall surfaces of the partition 10 configure the acoustic blocker on three sides of the right, left, and rear sides of the semi-private room. The front and top surfaces of the semi-private room are acoustically opened.

In the examples of FIG. 1, FIG. 2, and FIG. 3, the partition 10 is made of three components. Of the three components, two partitions 10 configuring the right and left sides of the semi-private room face to each other. The remaining one of the three components is disposed at the rear of the semi-private room. However, the partition 10 does not need to be made of three components. The partition 10 may only have portions that face each other. For example, the partition 10 may be of an integral type. In addition, the wall surface of the partition 10 may be flat or may be curved.

The flat speaker 3 is disposed on the wall surface of the partition 10. The sound emitting direction of the flat speaker 3 faces a portion that faces the wall surface on which the flat speaker 3 is disposed. In other words, the sound emitting direction of the flat speaker 3 faces the acoustic blocker.

Furthermore, as shown in FIG. 3, the flat speaker 3 outputs a sound in a predetermined range including a position of the head of a user. For example, the flat speaker 3 outputs a sound in the predetermined range at a predetermined height from a floor. As an example, the user, as shown in FIG. 3, stands and listens to the sound of the flat speaker 3. As shown in FIG. 4, in a case in which the user sits in a chair and listens to the sound, a mounting position in an up-down direction of the flat speaker 3 to the wall surface may be lowered. In addition, as shown in FIG. 2, a width of the flat speaker 3 in a plan view is approximately the same as a width (a length in the longitudinal direction in the plan view) of the partition 10. It is to be noted that the width of the flat speaker 3 corresponds to a width A of a portion in which a vibrating unit is disposed, the width A being a part of the length in the longitudinal direction in the plan view of the flat speaker 3. Therefore, the user, wherever being present at any position in the semi-private room, can listen to the sound that the flat speaker 3 outputs. However, in the present disclosure, the width of the flat speaker 3 may be smaller than the width of the partition 10. It is to be noted that the term "approximately the same" does not mean being completely the same and includes being substantially the same. The term "approximately the same" includes a case in which the width of the flat speaker 3 is slightly smaller than the width of the partition 10 to the extent that an effect such that the user, wherever being present at any position in the semi-private room, can listen to the sound that the flat speaker 3 outputs is able to be obtained.

The flat speaker 3 is connected to an information processing apparatus (not shown) such as a personal computer, for example. The flat speaker 3 receives an audio signal from the information processing apparatus. The flat speaker 3 reproduces the audio signal and outputs a sound. As a result, the user can listen to a sound of content, for example. In addition, the information processing apparatus may be connected to an information processing apparatus in a remote place, for example through a network. The information processing apparatus receives an audio signal from the remote place. As a result, the user can listen to the voice of a user in the remote place connected through the network.

The flat speaker 3 has a flat plate shape with a small thickness. The flat speaker 3 outputs a planar sound wave while an ordinary cone speaker outputs a spherical sound wave. The flat speaker 3 outputs a sound with strong directivity in a front direction (a normal direction of a main surface) of the flat speaker 3. For example, in a case in which the flat speaker 3 is an electrostatic speaker, a reproducible lower limit frequency Fmin is from about 80 Hz to about 250 Hz (a reproducible lower limit frequency will be described below with reference to FIG. 7).

As a result, the sound that the flat speaker 3 outputs is collected in the semi-private room. A height of the partition 10 is sufficiently larger than a height of the flat speaker 3. Therefore, the sound outputted from the flat speaker 3 is diffracted in the up-down direction, and does not leak from the semi-private room. In particular, a sound in a downward direction is completely blocked by a floor.

The width of the flat speaker 3 in a left-right direction is approximately the same as the width of the partition 10. Therefore, the sound outputted from the flat speaker 3 is diffracted in a width direction of the left-right direction more easily than the up-down direction. However, as will be described below, the flat speaker 3 further reduces diffraction in the left-right direction, with the structure of the enclosure.

As a result, the sound emitting apparatus 1 is able to significantly reduce sound leakage from the semi-private room. A person outside the semi-private room does not hear the sound outputted from the flat speaker 3. The user of the sound emitting apparatus 1 can listen to a sound of content or a conversation sound of the user in the remote place without worrying about sound leakage. In addition, the person outside the semi-private room does not worry about a sound from the semi-private room.

Figure 5:
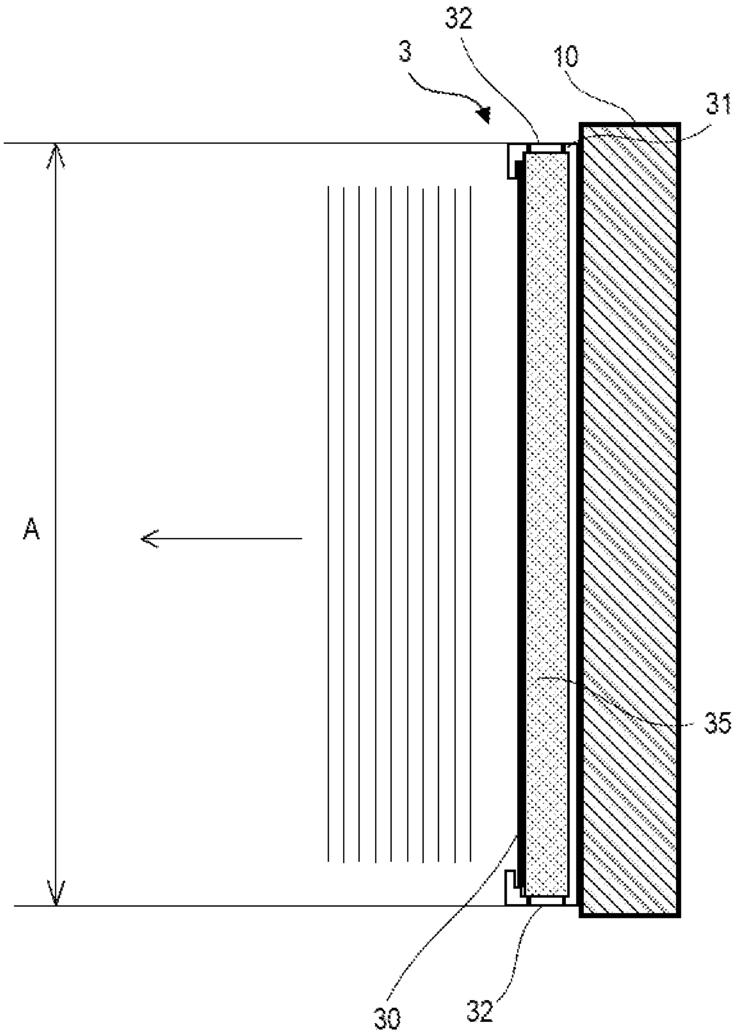
FIG. 5 is a transverse cross-sectional view showing a structure of a structure of a flat speaker 3.
Figure 6:
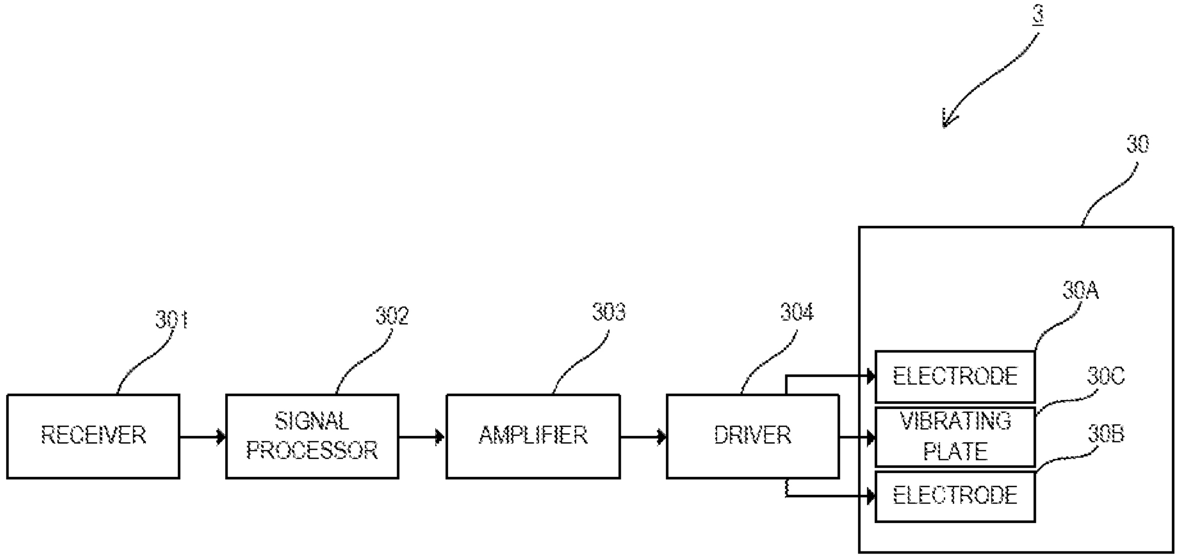
FIG. 6 is a block diagram showing a configuration of the flat speaker 3.

FIG. 5 is a transverse cross-sectional view showing a structure of a structure of the flat speaker 3. FIG. 6 is a block diagram showing a configuration of the flat speaker 3. The flat speaker 3 includes a vibrating unit 30, an enclosure 31, a port 32, and a sound absorbing material 35. In addition, the flat speaker 3 includes an receiver 301, a signal processor 302, an amplifier 303, and a driver 304, as a hardware configuration.

The receiver 301 includes an analog audio I/F, a digital audio I/F, or a communication I/F such as a USB. The receiver 301 receives an audio signal from an information processing apparatus. The signal processor 302 performs signal processing on the audio signal received by the receiver 301. For example, the signal processor 302 performs level control of the audio signal or adjustment of frequency characteristics. It is to be noted that the signal processor 302, in a case in which the receiver 301 receives an analog sound signal, converts the analog sound signal into a digital audio signal, and then performs signal processing. The signal processor 302 converts the audio signal on which the signal processing has been performed, into an analog sound signal, and outputs the analog sound signal to the amplifier 303.

The amplifier 303 amplifies the audio signal on which the signal processing has been performed by the signal processor 302. The driver 304 drives the vibrating unit 30 based on the audio signal amplified by the amplifier 303.

The vibrating unit 30 is an electrostatic speaker unit as an example. The vibrating unit 30 is structured to interpose a sheet-like vibrating plate 30C between two fixed electrodes 30A and 30B. The driver 304 generates an electrostatic force by applying a voltage to the fixed electrode 30A, the fixed electrode 30B, and the vibrating plate 30C. The driver 304 changes the electrostatic force by changing the voltage applied to the fixed electrode 30A and the fixed electrode 30B. The driver 304 vibrates the vibrating plate 30C due to a change in the electrostatic force. As a result, the flat speaker 3 outputs a planar sound wave.

The enclosure 31 includes an aperture to dispose the vibrating unit 30, and has a rectangular parallelepiped box shape having a height in the depth direction. Specifically, the enclosure 31 holds the outer periphery of the vibrating unit 30 by the aperture in front. It is to be noted that the enclosure 31 may preferably hold the vibrating unit 30 through a shock-absorbing material such as rubber, a foaming agent, or a cotton-like material. The vibrating unit 30 outputs a sound in opposite phases, respectively, in the front direction (toward the outside of the enclosure 31) and a rear direction (toward the inside of the enclosure 31) of the enclosure 31. The enclosure 31 internally keeps the sound to be outputted in the rear direction.

In the example of FIG. 5, the enclosure 31 includes a sound absorbing material 35 inside. The sound absorbing material 35 absorbs a sound in a predetermined frequency band or higher, among sounds outputted from the vibrating unit 30 in the rear direction. As a result, the sound absorbing material 35 reduces generation of vibrations, reflected waves, and standing waves on the wall surface of the enclosure 31 in the predetermined frequency band or higher. It is to be noted that the sound absorbing material 35 is not an essential configuration in the present disclosure.

The enclosure 31 includes an aperture to configure the port 32 on a side surface. The port 32 has an elongated shape in the up-down direction of the flat speaker 3. The port 32 configures a Helmholtz resonator with a thickness of the wall of the enclosure 31 being a length L in a tube axial direction.

The resonance frequency Fr of the Helmholtz resonator is represented by a formula (A): $Fr=(c/2\pi)\cdot(S/VL)^{1/2}$, where a volume of the enclosure 31 is V, a speed of sound is c, a length (the thickness of the wall of the enclosure 31) in the tube axial direction is L, and a cross-sectional area of the port 32 is S. As the cross-sectional area S of the port 32 is increased, the volume V of the enclosure 31 is decreased, and the thickness L of the enclosure 31 is decreased, the resonance frequency Fr is increased. The volume V of the enclosure 31 is represented by $V=Hw\cdot d$, where Hw is an area of a surface on which the vibrating unit 30 is disposed, and d is a depth (the length in the left-right direction in FIG. 5) of the enclosure 31. In addition, the area Hw is represented by $Hw=A\cdot H$, where a width (a width A shown in FIGS. 2 and 5) of the surface of the enclosure 31 on which the vibrating unit 30 is disposed is set to A, and a height (a length in the up-down direction in a plan view) of the enclosure 31 is set to H.

Figure 7:
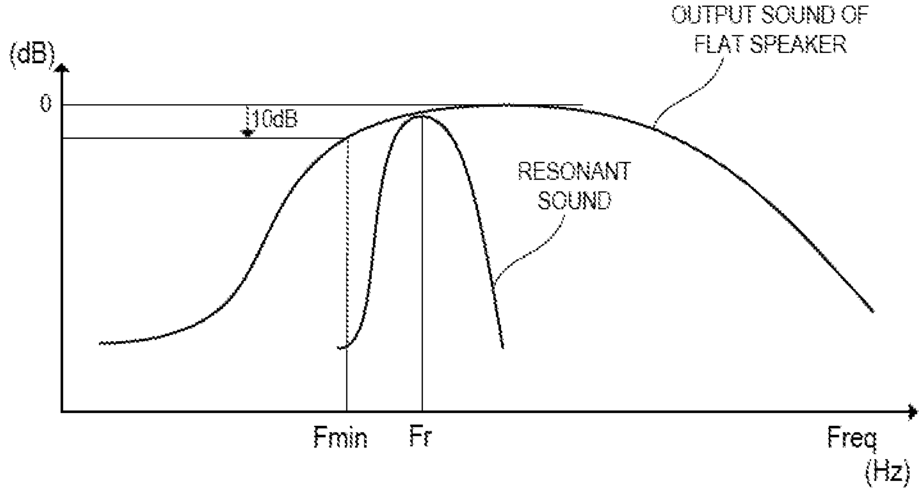
FIG. 7 is a graph showing a relationship between a resonance frequency Fr and a reproducible lower limit frequency Fmin of a vibrating unit 30.

The resonance frequency Fr of the Helmholtz resonator according to the present embodiment, unlike a typical bass reflex port, is set to a high frequency. With reference to FIG. 7, the following will describe that a resonance frequency Fr is set to a reproducible lower limit frequency Fmin of the vibrating unit 30 or higher.

FIG. 7 is a graph showing a relationship between the resonance frequency Fr and the reproducible lower limit frequency Fmin of the vibrating unit 30. The horizontal axis of the graph indicates a frequency and the vertical axis indicates a level.

The reproducible lower limit frequency Fmin is a frequency to be −10 dB to the peak level, for example. In a case in which the area of the vibrating unit 30 is 1 $m^2$ (equivalent to A0 size), the frequency indicating −10 dB to the peak level is about 80 Hz. In a case in which the area of the vibrating unit 30 is equivalent to A4 size, the frequency indicating −10 dB to the peak level is about 250 Hz. It is to be noted that the reproducible lower limit frequency Fmin is not limited to a frequency to be set to −10 dB to the peak level. For example, the reproducible lower limit frequency Fmin may be a frequency to be set to −6 dB to the peak level.

As shown in FIG. 7, the resonance frequency Fr and the reproducible lower limit frequency Fmin have the relationship of a formula (B): $Fr\geq Fmin$. The port 32, in the low frequency band lower than or equal to the resonance frequency Fr, outputs a sound as it is to be outputted in the rear direction of the vibrating unit 30. The sound to be outputted in the rear direction of the vibrating unit 30 is in the opposite phase of the sound to be outputted in the front direction. Therefore, the port 32 outputs a sound in the opposite phase, in the low frequency band lower than or equal to the resonance frequency Fr. As a result, among sounds that are diffracted from the front direction of the vibrating unit 30 to sides, a sound from the reproducible lower limit frequency Fmin to the resonance frequency Fr is cancelled by the sound in the opposite phase to be outputted from the port 32. In addition, a sound in a frequency lower than or equal to the reproducible lower limit frequency Fmin is not outputted at an effective level.

As a result, the sound outputted in the front direction of the vibrating unit 30, even when being diffracted to the sides, is cancelled by the sound in the opposite phase from the port 32. Therefore, the sound emitting apparatus 1 is able to significantly reduce sound leakage.

As the resonance frequency Fr is set higher, the sound diffracted to the sides is cancellable to a higher frequency, so that the resonance frequency Fr may preferably be set to be high in a structurally possible range. It is to be noted that the enclosure 31 may preferably be made of a material that is thin and has a large amount of sound insulation. For example, the enclosure 31 may preferably use a metal member that has a large area density to the thickness and has high rigidity.

However, a sound in a high frequency band among sounds to be outputted in the rear direction of the vibrating unit 30 is absorbed by the sound absorbing material 35. Therefore, when the enclosure 31 is filled with the sound absorbing material 35, the relationship between the resonance frequency Fr and an effective lower limit frequency of the sound absorbing material 35 may preferably be set so as to reduce the effective lower limit frequency or less of the sound absorbing material 35 by the resonance frequency Fr to the reproducible lower limit frequency Fmin. As a result, the sound emitting apparatus 1 is able to cope with sound leakage over a wide frequency band. For example, in a case of a urethane foam with the effective lower limit frequency of 1.5 kHz, the resonance frequency Fr may be set near 1.5 kHz, and, in a case of glass wool with the effective lower limit frequency of 500 Hz, the resonance frequency Fr may be set near 500 Hz. It is to be noted that the effective lower limit frequency is determined by a thickness (a length in a front-rear direction) of the sound absorbing material including a rear air layer. The frequency corresponding to a length of four times the thickness of the sound absorbing material corresponds to the effective lower limit frequency. In other words, the thickness of the sound absorbing material corresponds to 0.25 times the wavelength of a sound wave desired to be absorbed.

It is to be noted that the width A of the enclosure 31 shown in FIG. 2 and FIG. 5 may preferably have some length to the wavelength of a sound wave corresponding to the resonance frequency Fr so that the sound wave to be outputted in the front direction of the vibrating unit 30 may not be easily diffracted in the rear direction. The rear surface of the enclosure 31 vibrates with the sound to be outputted in the rear direction of the vibrating unit 30. However, the sound lower than or equal to the resonance frequency Fr is outputted as it is from the port 32, so that sound pressure inside the enclosure 31 is not increased. Therefore, the sound lower than or equal to the resonance frequency Fr is hard to vibrate the rear surface. Therefore, the width A of the rear surface of the enclosure 31 may preferably have some length to the wavelength λ of a sound wave corresponding to the resonance frequency Fr. Theoretically, in order that the sound wave to be outputted in the front direction of the vibrating unit 30 is not diffracted to the rear side, a path difference due to a sound wave bypassing the enclosure 31 may be preferably 0.5λ or more. Therefore, in a case in which the enclosure 31 itself is used as a sound insulation wall, at least a formula (C): $A \geq 0.25\lambda$ is preferably satisfied in order to reduce diffraction of the sound to be outputted in the front direction of the vibrating unit 30. In addition, the width A and the resonance frequency Fr may more preferably satisfy the relationship of a formula (D) $A \geq 0.5\lambda$.

Figure 21:
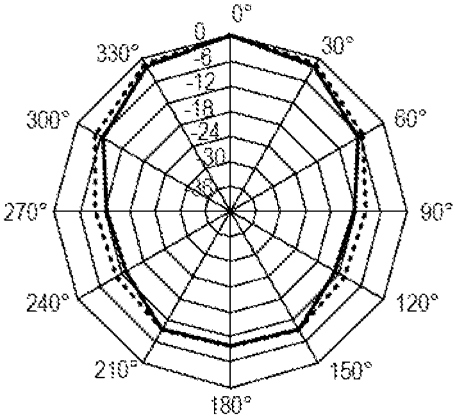
FIG. 21 is a view showing a sound pressure measurement result in the 500 Hz frequency band (1/1 octave band).
Figure 22:
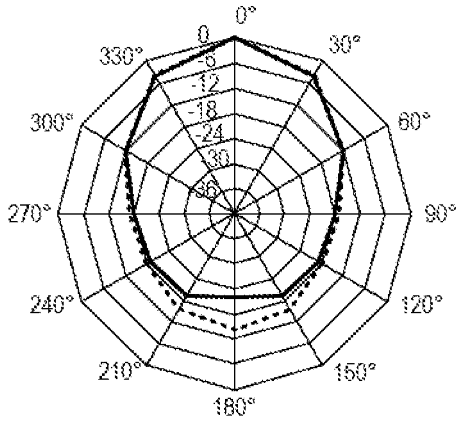
FIG. 22 is a view showing a sound pressure measurement result in the 1 kHz frequency band (1/1 octave band).

FIG. 21 and FIG. 22 are views showing a sound pressure measurement result.

The sound pressure measurement results shown in FIG. 21 and FIG. 22, in a case in which the front direction of the flat speaker 3 is set to 0° and the rear direction is set to 180°, indicate sound pressure values (relative values) for every 30° using a sound pressure value at 0° in the front direction as a reference (0 dB).

The width A of the enclosure 31 at the time of the measurement in FIG. 21 and FIG. 22 is 230 mm. FIG. 21 shows a sound pressure measurement result in about 500 Hz frequency band (1/1 octave band) (a wavelength band of about 680 mm). FIG. 22 shows a sound pressure measurement result in about 1 kHz frequency band (1/1 octave band) (a wavelength band of about 340 mm). The solid lines shown in FIG. 21 and FIG. 22 indicate measurement results in a case in which the enclosure 31 includes the port 32. The dashed lines indicate measurement results in a case in which the enclosure 31 does not include the port 32, as a reference example.

In the example of FIG. 21, the width A of the enclosure 31 is 230 mm to the wavelength λ=680 mm. In other words, the relationship of $A \geq 0.5\lambda$ is not satisfied. In such a case, the sound pressure value in the rear direction remains the same regardless of the presence or absence of the port 32 of the enclosure 31 due to the large influence of sound waves that are diffracted from the front side to the rear side. In other words, in a case in which the relationship of $A \geq 0.5\lambda$ is not satisfied, the effect of reducing the sound wave in the rear direction by the port 32 is not able to be produced.

In contrast, in the example of FIG. 22, the width A of the enclosure 31 is 230 mm to the wavelength λ=340 mm. In other words, the relationship of $A \geq 0.5\lambda$ is satisfied. In the example of FIG. 22, the sound pressure value in the rear direction is smaller in the case in which the enclosure 31 includes the port 32 than in the case in which the enclosure 31 does not include the port 32. In other words, in a case in which the relationship of $A \geq 0.5\lambda$ is satisfied, the effect of reducing the sound wave in the rear direction by the port 32 is able to be apparently produced.

As a result, the enclosure 31 reduces a sound to be outputted in the rear direction due to vibration of the rear surface.

Figure 8:
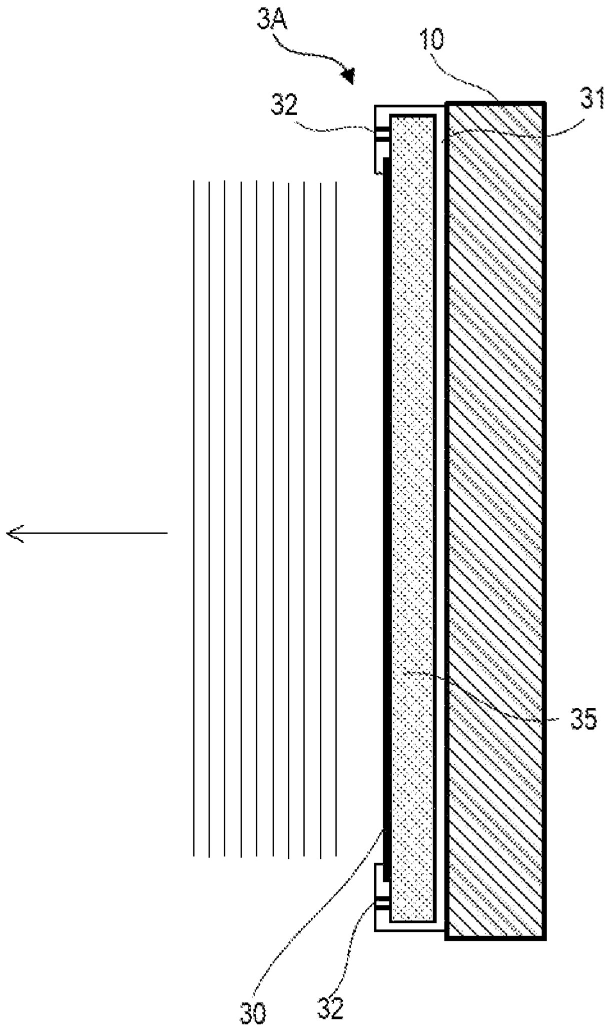
FIG. 8 is a cross-sectional view showing an example in which a port 32 is provided in front.

It is to be noted that the position of the port 32 is not limited to the side surface of the enclosure 31. FIG. 8 is a cross-sectional view showing an example in which the port 32 is provided in front. The enclosure 31 shown in FIG. 8 has a width longer than the width of the vibrating unit 30. The enclosure 31 includes the port 32 on both left and right sides of the front side. In such a case, the sound that is outputted in the front direction of the vibrating unit 30 and is to be diffracted to the sides is canceled by the sound in the opposite phase to be outputted from the port 32 provided in the front of the enclosure 31. In other words, an aperture configuring the port 32 is directed in a direction that intersects the sound emitting direction of the speaker unit, and is directed in a direction other than an opposite direction to the sound emitting direction or is directed in the same direction as the sound emitting direction of the speaker unit.

Figure 9:
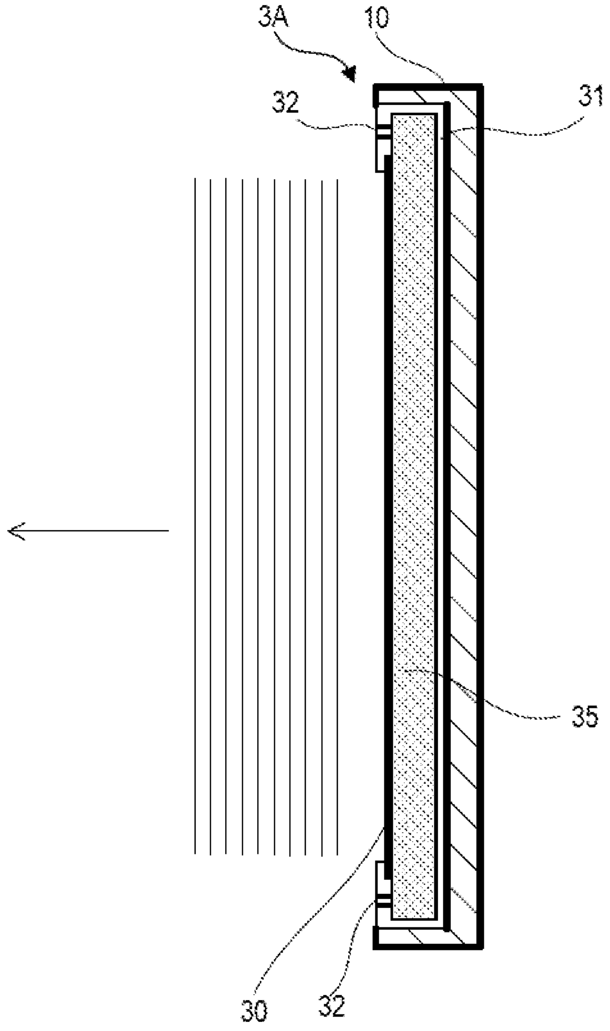
FIG. 9 is a cross-sectional view showing a case in which a part of a partition 10 serves as an enclosure.

It is to be noted that a part of the partition 10 may also serve as the enclosure. FIG. 9 is a cross-sectional view showing a case in which a part of a partition 10 serves as the enclosure. In such a case, the enclosure 31 is included by the partition 10. Accordingly, the sound emitting apparatus 1 reduces an overhang in the front direction of the flat speaker 3. Therefore, the sound emitting apparatus 1 has a small thickness and excellent design.

In addition, the flat speaker 3 may be covered with a cover made of a material such as an acoustically open mesh, perforated metal, or the like. In such a case, the flat speaker 3 is not noticeable, so that the sound emitting apparatus 1 has more excellent design.

Figure 10:
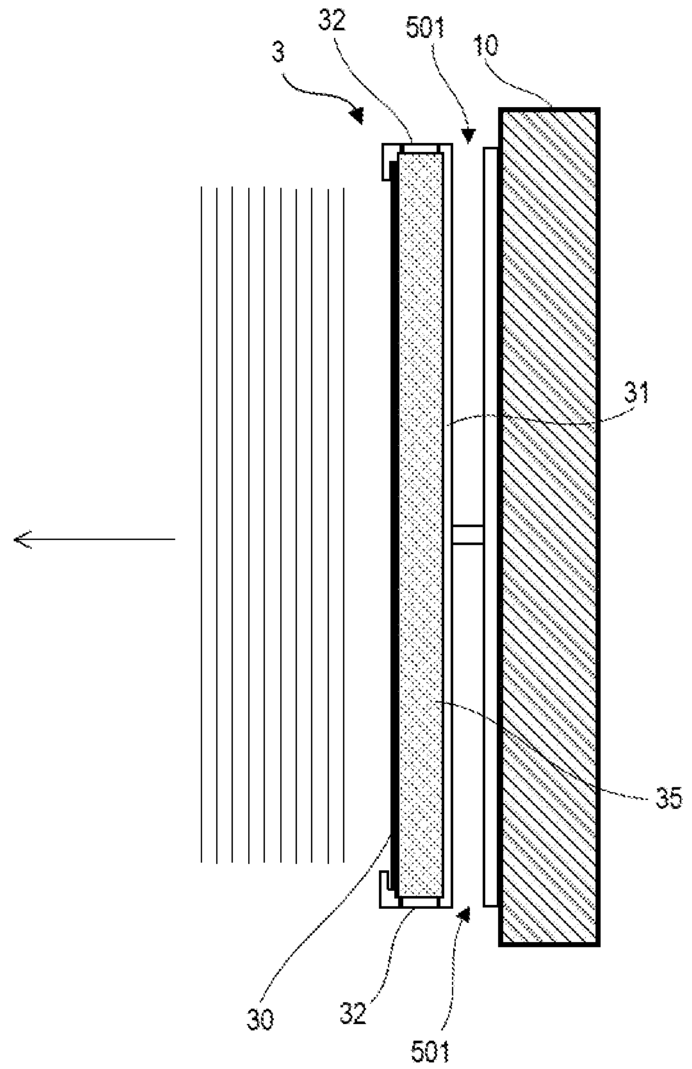
FIG. 10 is a cross-sectional view showing a case in which a resonance tube 501 is provided at a rear of the enclosure 31.

FIG. 10 is a cross-sectional view showing a case in which a resonance tube 501 is provided at the rear of the enclosure 31. The resonance tube 501 with a cylindrical shape is provided at the rear of the enclosure 31. The resonance tube 501 has a pipe with some length in the left-right direction, and an aperture. The resonance tube 501, although not shown, includes a plurality of resonance tubes in the up-down direction. The plurality of resonance tubes 501 each configure a Helmholtz resonator. The plurality of resonance tubes 501 each have a pipe with a different length.

The sound incident in the aperture resonates at a specific resonance frequency according to the length of the pipe. A resonant sound is a sound in the opposite phase to an incident sound. Therefore, the resonance tubes 501 produce a sound absorption effect at a specific frequency near the aperture. In a case in which each resonance frequency of the plurality of resonance tubes 501 is different, the sound absorption effect is produced over a predetermined frequency band.

Accordingly, the sound diffracted to the sides is further reduced. Therefore, the sound emitting apparatus 1 is able to further significantly reduce sound leakage.

Figure 11:
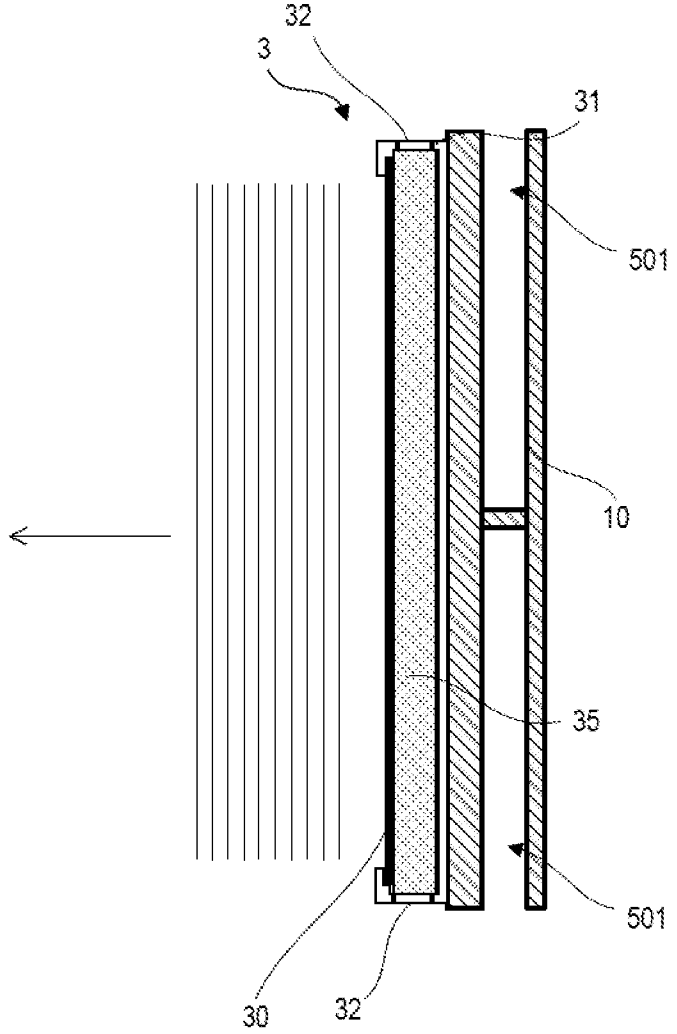
FIG. 11 is a cross-sectional view showing a modification of the resonance tube 501.

FIG. 11 is a cross-sectional view showing a modification of the resonance tube 501. The resonance tube 501, as shown in FIG. 11, may be provided in the partition 10. In addition, the aperture of the resonance tube 501 may be provided on the front or flat side of the partition 10. In such a case, the sound wave reflected on the wall surface of the partition 10 interferes with the resonant sound, which also makes it possible to produce an acoustic conditioning effect. Therefore, the sound emitting apparatus 1 is also able to have an acoustic conditioning function to condition reverberation of a sound while reducing the sound diffracted to the sides.

Figure 12:
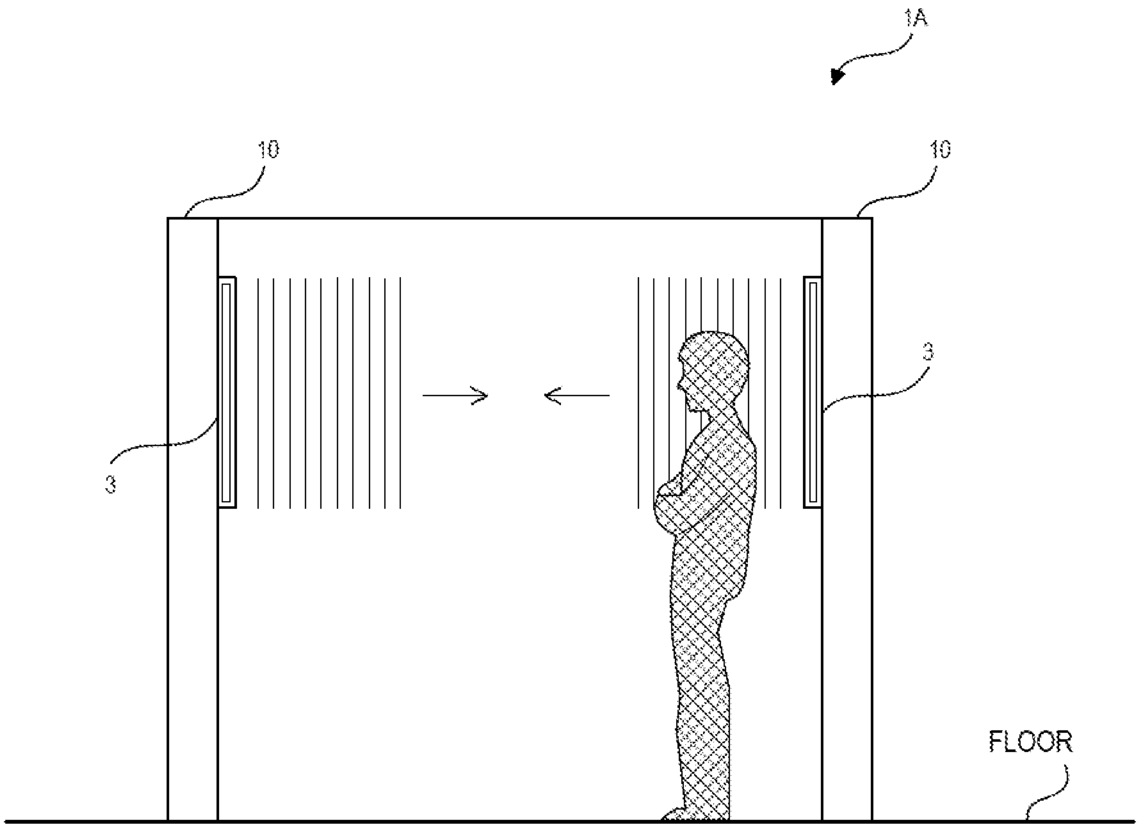
FIG. 12 is a front view of a sound emitting apparatus 1A including a plurality of flat speakers 3.

FIG. 12 is a front view of a sound emitting apparatus 1A including a plurality of flat speakers 3. In the example of FIG. 12, the sound emitting apparatus 1A includes a plurality of flat speakers 3 that face each other. In such a case, the user can listen to a sound of the flat speaker 3 from both front and rear directions of the user. In this case as well, the sound emitting apparatus 1A is able to significantly reduce sound leakage. It is to be noted that the plurality of flat speakers 3 do not need to face each other.

Figure 13:
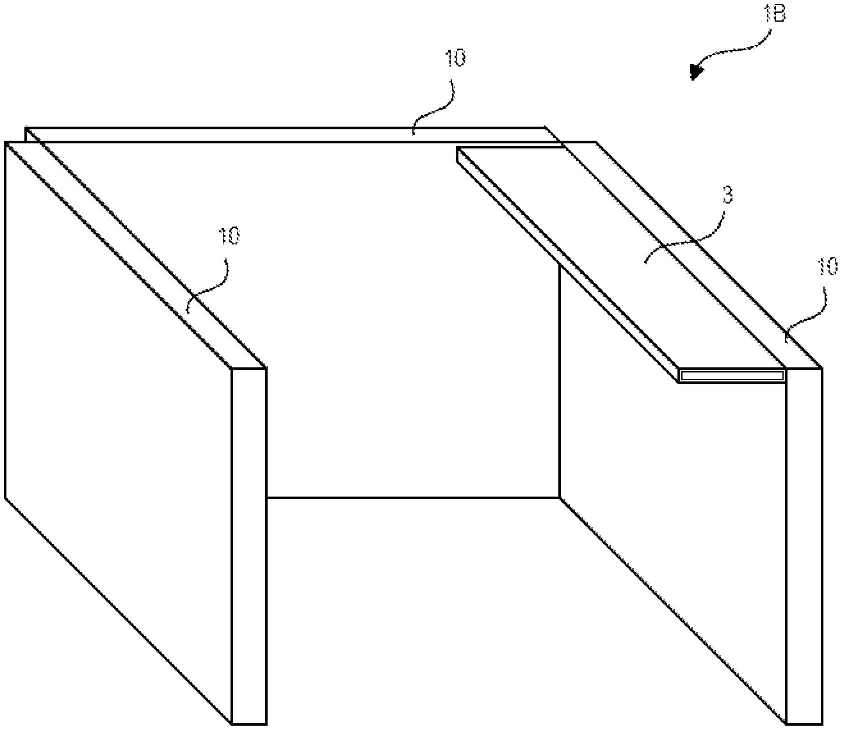
FIG. 13 is a perspective view showing a configuration of a sound emitting apparatus 1B including a flat speaker 3 at a top surface.

FIG. 13 is a perspective view showing a configuration of a sound emitting apparatus 1B including a flat speaker 3 at a top surface. As shown in FIG. 13, the flat speaker 3 may be disposed so as to be perpendicular to a main surface of the partition 10, and may be disposed so as to be inclined at a predetermined angle. In such a case, the flat speaker 3 outputs a plane wave toward a floor being an example of an acoustic blocker. In this case as well, the sound emitting apparatus 1B is able to significantly reduce sound leakage.

Figure 14:
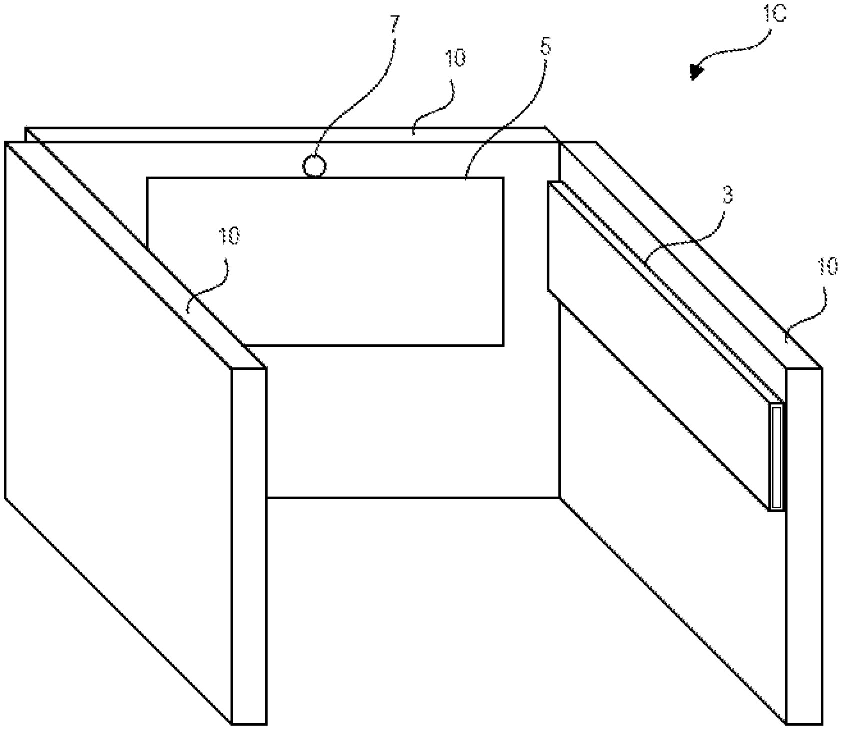
FIG. 14 is a perspective view showing a configuration of a sound emitting apparatus 1C including a display 5 and a microphone 7.
Figure 15:
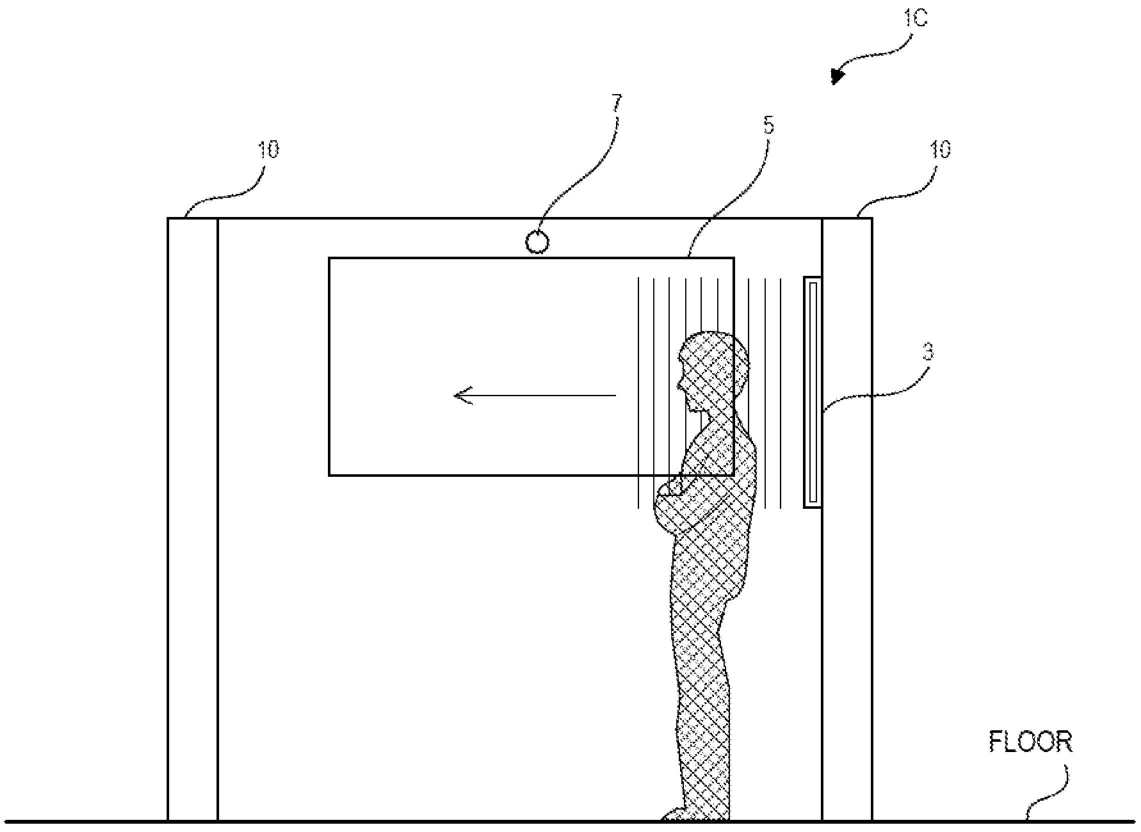
FIG. 15 is a front view of the sound emitting apparatus 1C.

FIG. 14 is a perspective view showing a configuration of a sound emitting apparatus 1C including a display 5 and a microphone 7. FIG. 15 is a front view. The display 5 and the microphone 7 are provided on the partition 10 disposed at the rear of the semi-private room. The display 5 receives and displays image data from an information processing apparatus installed in a remote place. The display 5 displays the image data captured by a camera in the remote place. The microphone 7 collects a voice uttered by the user and sends the voice to the information processing apparatus in the remote place. The flat speaker 3 receives and emits an audio signal from the information processing apparatus installed in the remote place. As a result, the sound emitting apparatus 1C implements a remote teleconference.

The microphone 7 is installed near the top of the partitions 10. In other words, the microphone 7, as shown in FIG. 15, is disposed outside a directional range of the flat speaker 3. Therefore, the microphone 7 does not collect a sound in the remote place, the voice having been outputted from the flat speaker 3. Therefore, the sound emitting apparatus 1C reduces generation of an echo.

Figure 16:
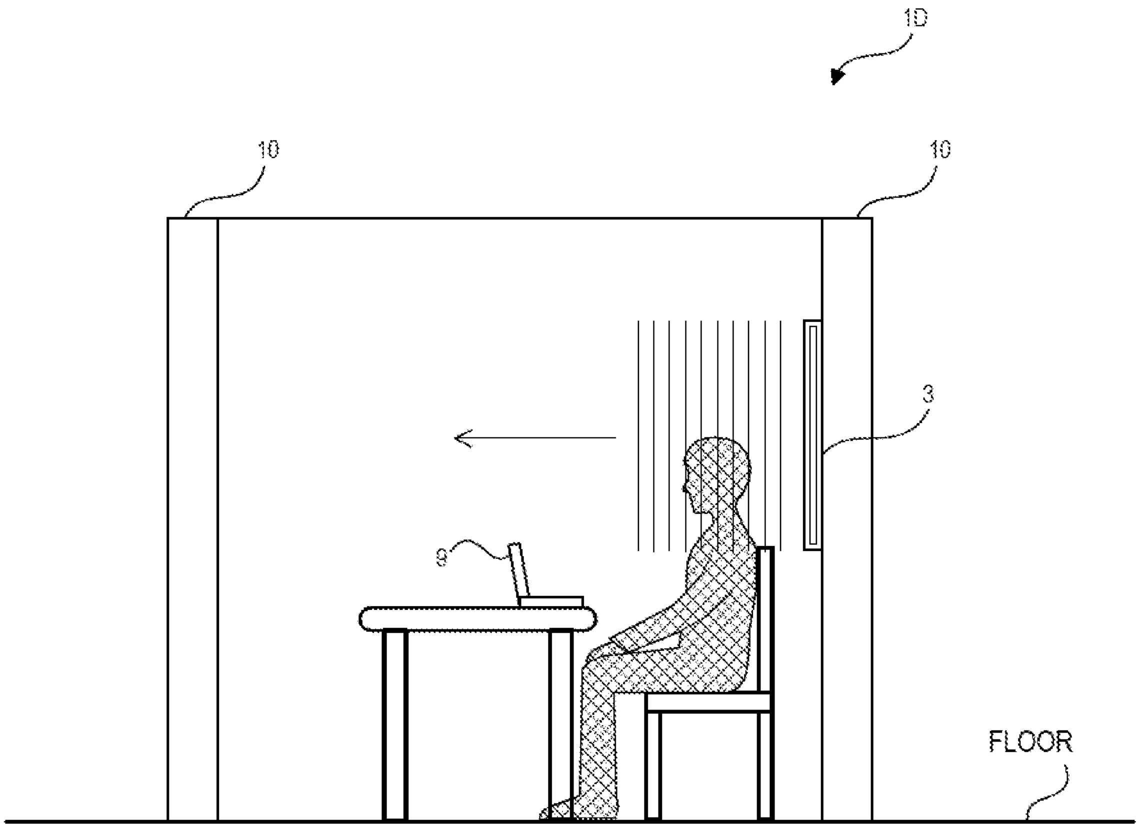
FIG. 16 is a front view of the sound emitting apparatus 1C in a case in which a user sits and operates a personal computer (a PC) 9.

It is to be noted that, as shown in FIG. 16, even when the user sits down and operates the personal computer (PC) 9, the microphone installed on the PC 9 is outside the directional range of the flat speaker 3. In this case as well, the sound emitting apparatus 1C is able to reduce the generation of an echo.

Figure 17:
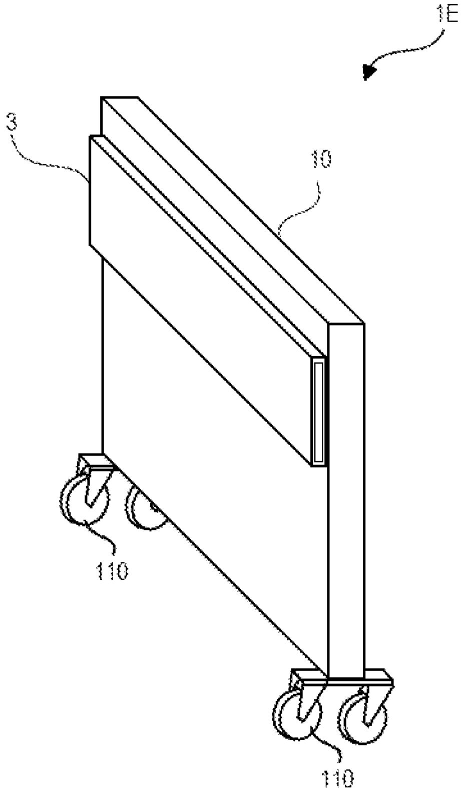
FIG. 17 is a perspective view of a sound emitting apparatus 1E including a caster 110 being an auxiliary tool that assists movement.

FIG. 17 is a perspective view of a sound emitting apparatus 1E including a caster 110 being an auxiliary tool that assists movement. The sound emitting apparatus 1E includes casters 110 that supports a lower part so as to prevent a fall of the partition 10 in a thickness direction and assists movement. Other configurations are the same as the configurations of the sound emitting apparatus 1.

The user can easily move one or more sound emitting apparatuses 1E to any position by using the casters 110 to block a view and sound so as to easily configure a semi-private room even in an open space. Such a configured semi-private room, as with the sound emitting apparatus 1 described above, is able to significantly reduce sound leakage from the semi-private room, and a person outside the semi-private room do not hear the sound outputted from the flat speaker 3. The user of the sound emitting apparatus 1 can listen to a sound of content or a conversation sound of a user in the remote place without worrying about sound leakage. In addition, the person outside the semi-private room does not worry about a sound from the semi-private room.

Since the sound emitting apparatus 1E is able to be easily moved, the flat speaker 3 may be installed facing outward in the semi-private room. In a case of being installed facing outward in the semi-private room, the flat speaker 3 outputs a masking sound. It is to be noted that the sound emitting apparatus 1E may include the flat speaker 3 on both wall surfaces. In such a case, the sound emitting apparatus 1E outputs a sound of content or a voice of a teleconference by the flat speaker 3 being a first directional speaker installed facing inward, and outputs a masking sound by the flat speaker 3 being a second directional speaker installed on the wall surface (facing outward) on the opposite side.

Figure 18:
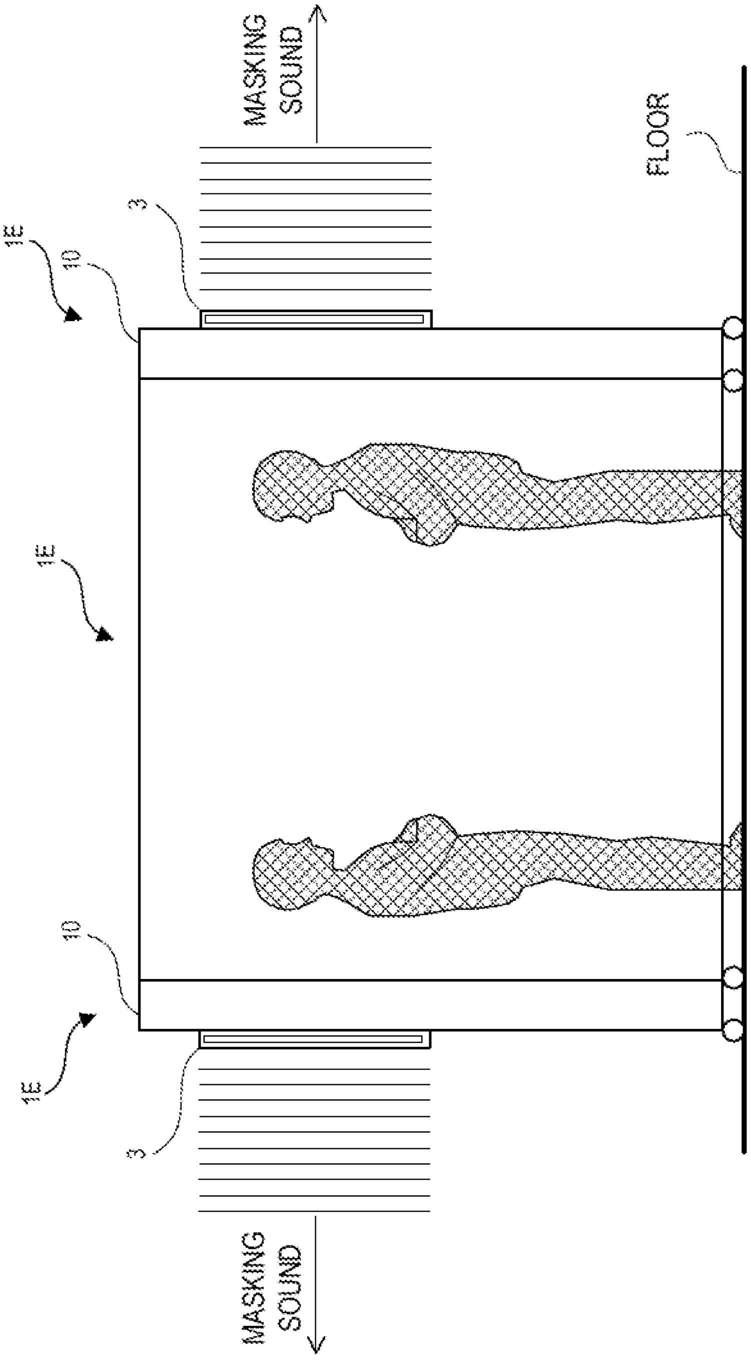
FIG. 18 is a front view showing a configuration in a case in which a masking sound is outputted.

FIG. 18 is a front view showing a configuration in a case in which the masking sound is outputted. In the example of FIG. 18, the sound emitting apparatus 1E is disposed on the rear, right side, and left side surfaces of the semi-private room. All flat speakers 3 of the sound emitting apparatuses 1E are set to face outward.

The flat speaker 3 outputs a masking sound. The masking sound blocks an outsider from understanding content of a statement made by a person conducting a conversation in the semi-private room. The masking sound may preferably include a disturbing sound that disturbs a voice, a background sound that occurs continuously, and a production sound that occurs intermittently. The disturbing sound, for example, is used such that a voice of a person is changed on a time axis or a frequency axis and lexically makes no sense (the content is not understandable). The disturbing sound has human voice quality, but is unrecognizable as a conversational voice uttered by a person. Therefore, the disturbing sound may give a listener an uncomfortable feeling and cause discomfort when the listener hears the sound for a long time or at an excessive volume. Then, the disturbing sound may preferably be combined with the background sound and the production sound. The background sound is a sound such as a murmur of a stream or a rustle of trees, for example, and a comfortable sound to which the outsider is not likely to pay attention. As a result, the background sound is able to reduce the uncomfortable feeling of the disturbing sound and also reduce the discomfort when a background noise level is raised and the disturbing sound is made unnoticeable. In addition, the production sound is a high production sound such as intermittent musical note. As a result, the production sound also draws an attention of the outsider to the production sound, and makes the uncomfortable feeling of the disturbing sound less noticeable from an auditory psychological perspective.

In the example of FIG. 18, all the flat speakers 3 of the sound emitting apparatuses 1E are set to face outward. However, the flat speaker 3 may be installed facing inward. The flat speaker 3 installed facing inward outputs a target sound (a sound of content, a voice of a teleconference, or the like).

Figure 19:
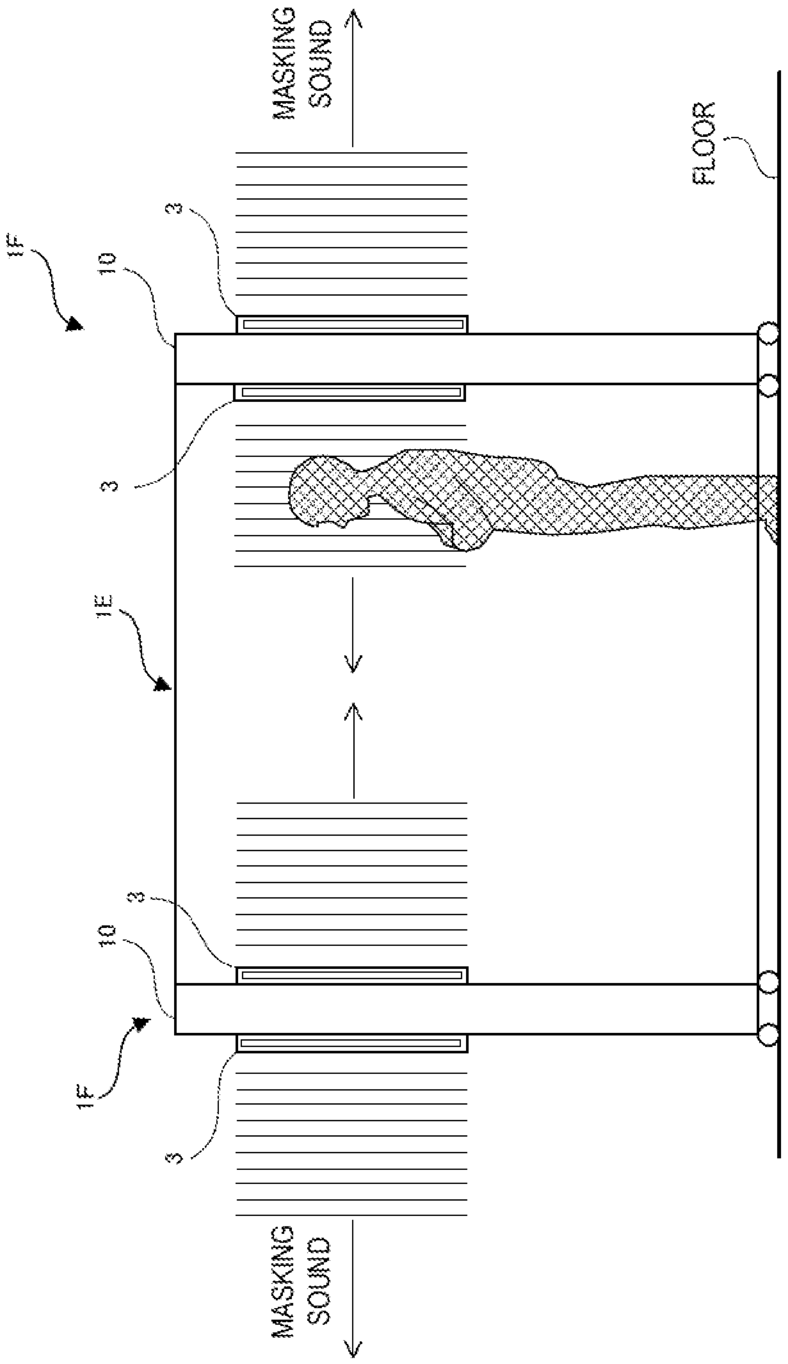
FIG. 19 is a front view showing a case in which a sound emitting apparatus 1F including a flat speaker 3 on both sides is applied to a semi-private room.

FIG. 19 is a front view showing a case in which a sound emitting apparatus 1F including a flat speaker 3 on both sides is applied to a semi-private room. The sound emitting apparatus 1F includes the flat speaker 3 on both sides. In the example of FIG. 19, the sound emitting apparatus 1F is disposed on the right side and left side surfaces of the semi-private room. The sound emitting apparatus 1E including the flat speaker 3 on one side is disposed at the rear of the semi-private room.

In such a case, the sound emitting apparatus 1F outputs a masking sound by the flat speaker 3 being the second directional speaker installed facing outward, and outputs a target sound (a sound of content, a voice of a teleconference, or the like) by the flat speaker 3 being the first directional speaker installed facing inward.

Figure 20:
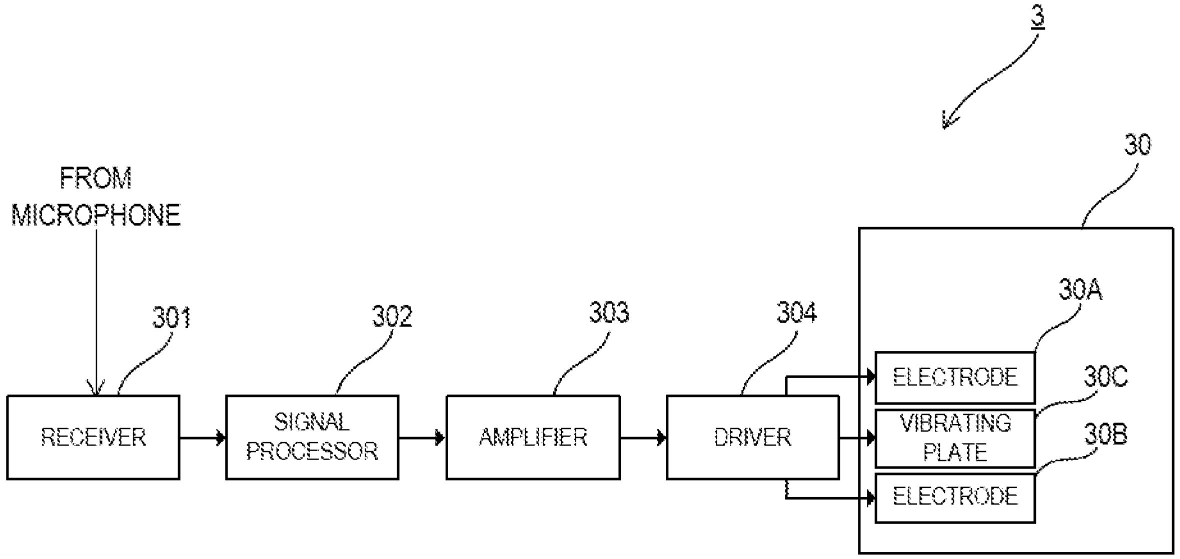
FIG. 20 is a block diagram showing a configuration of the flat speaker 3 that performs signal processing based on an audio signal collected with a microphone (a microphone 7 or a microphone of the PC 9).

FIG. 20 is a block diagram showing a configuration of the flat speaker 3 that performs signal processing based on an audio signal according to a sound collected by a microphone (the microphone 7 or the microphone of the PC 9). The hardware configuration is the same as the configuration shown in FIG. 6.

The receiver 301 receives an audio signal according to the sound collected by the microphone (the microphone 7 or the microphone of the PC 9). The signal processor 302 adjusts a volume of the audio signal to be outputted to a subsequent stage according to a volume of the audio signal according to the sound collected by the microphone. For example, the signal processor 302 measures in advance the maximum volume to such an extent that the sound of the flat speaker 3 does not leak from the semi-private room, and the volume of the sound collected then by the microphone. Subsequently, the signal processor 302 adjusts the volume, based on the volume of the audio signal according to the sound collected by the microphone, and the volume of the sound collected by the microphone measured in advance. As a result, the volume is adjusted to the optimal volume without the need for the user to control the volume. In addition, the signal processor 302 may adjust frequency characteristics of an audio signal instead of or together with the volume.

In addition, the signal processor 302, when outputting the masking sound, may adjust the volume of the masking sound according to the volume of the audio signal according to the sound collected by the microphone. In such a case, the signal processor 302 performs processing of reducing the volume to the minimum required for the masking sound to produce an effect.

It is to be noted that the signal processor 302 may preferably perform fade-in processing when the masking sound starts to be outputted and may preferably perform fade-out processing when the masking sound stops. As a result, the signal processor 302 makes the masking sound more unnoticeable to the outsider.

In addition, the flat speaker 3, when outputting the masking sound, may divide into a plurality of units. In such a case, the signal processor 302 controls a composite wave front of a sound wave outputted from the plurality of units by controlling sound emitting timing of the plurality of units. As a result, the signal processor 302 is able to control the shape of the wave front, and is able to control directivity. The masking sound is able to be directed in any direction. It is to be noted that the signal processor 302 may control the sound emitting timing by delaying the audio signal of a plurality of channels by digital signal processing or may delay an analog audio signal to be supplied to each flat speaker 3 by an analog circuit.

In addition, the signal processor 302 may perform processing to reduce the sense of localization of the flat speaker 3. For example, the signal processor 302 convolves an audio signal with the inverse function of a previously obtained transfer function (a head-related transfer function) from the flat speaker 3 obtained in advance to the head of the user. As a result, a sound from the flat speaker 3 installed behind the user is not localized behind the user, so that the user can hear the sound with a more natural impression.

In addition, the signal processor 302 may perform low-pass filter processing to cut a band equal to or higher than a predetermined frequency (5 kHz, for example). The localization of the sound in the front-rear direction and the up-down direction is dependent on the frequency characteristics of 5 kHz or higher. Therefore, the signal processor 302 is also able to reduce the sense of localization of the flat speaker 3 by performing the low-pass filter processing to cut the band equal to or higher than a predetermined frequency (5 kHz, for example).

In addition, the signal processor 302 may perform processing to add a reverberant sound. The signal processor 302 is also able to reduce the sense of localization of a direct sound by adding a reverberant sound.

The descriptions of the embodiments of the present disclosure are illustrative in all points and should not be construed to limit the present disclosure. The scope of the present disclosure is defined not by the foregoing embodiments but by the following claims for patent. Further, the scope of the present disclosure is intended to include all modifications within the scopes of the claims for patent and within the meanings and scopes of equivalents.

For example, in the present embodiment, the flat speaker is shown as an example of a directional speaker. However, the directional speaker may be a dynamic speaker, for example. In addition, the directional speaker may be an array speaker obtained by arranging a plurality of dynamic speakers.

In addition, the sound emitting apparatus of the present embodiment shows an example in which the partition 10 and the flat speaker 3 are provided. However, the partition 10 is not essential. For example, the flat speaker 3 is able to be hung on a ceiling. In such a case, a sound emitting apparatus includes a speaker unit and an enclosure of the speaker unit. In addition, the sound emitting apparatus may include a support component that supports a bottom surface (a downward side surface) of the enclosure from a floor surface.

In various embodiments, a sound emitting apparatus includes a speaker unit, and an enclosure of the speaker unit having an aperture configuring a Helmholtz resonator, wherein a resonance frequency Fr of the Helmholtz resonator and a reproducible lower limit frequency Fmin of the speaker unit satisfy a formula (1). Formula (1): $Fr \geq Fmin$. A volume V of the enclosure, an area S of the aperture, and a plate thickness L of the enclosure may satisfy a formula (2) including a sound velocity c. Formula (2): $Fr=(c/2\pi)\cdot(S/VL)^{1/2}$. A width A of the enclosure and a wavelength λ of a sound wave corresponding to the resonance frequency Fr may satisfy a formula (3). Formula (3): $A \geq 0.25\lambda$. A width A of the enclosure and a wavelength λ of a sound wave corresponding to the resonance frequency Fr may satisfy a formula (4). Formula (4): $A \geq 0.5\lambda$. The aperture may be directed in a direction intersecting a sound emitting direction of the speaker unit and in a direction other than a direction opposite to the sound emitting direction. The aperture may be directed in a same direction as a sound emitting direction of the speaker unit. The speaker unit may be a flat speaker. The sound emitting apparatus may include a resonance tube outside the enclosure. The sound emitting apparatus may include a sound absorbing material inside the enclosure. The resonance frequency Fr of the Helmholtz resonator may be less than or equal to an effective lower limit frequency of the sound absorbing material. The speaker unit and the enclosure may be connected through a shock-absorbing material. The sound emitting apparatus may include a wall surface to dispose the enclosure, wherein a part of the wall surface may be at least a portion of the enclosure. The sound emitting apparatus may also include a plate material including the wall surface, and an auxiliary tool to support the plate material and assist movement of the plate material.

In various embodiments, a sound emitting apparatus includes a plurality of wall surfaces configuring an acoustic blocker that is partially open and partially blocked, in a plan view, and having a first wall surface and a second wall surface, and a directional speaker disposed on the first wall surface, and having a sound emitting direction to the acoustic blocker.

In various embodiments, a sound emitting apparatus includes a plate material configuring an acoustic blocker, a directional speaker disposed on a first wall surface of the plate material, and an auxiliary tool to support the plate material and assist movement of the plate material. The directional speaker may be a flat speaker. A plurality of the directional speakers may be installed on the first wall surface and the second wall surface. The plurality of directional speakers may have sound emitting directions facing each other. A width of the directional speaker and a width of the first wall surface on which the directional speaker is disposed may be substantially same. The sound emitting apparatus may include a microphone provided outside a directional range of the directional speaker. The sound emitting apparatus may include a signal processor that adjusts volume or frequency characteristics of an audio signal supplied to the directional speaker according to the volume of a sound collected by the microphone. The signal processor may perform localization reduction processing to reduce sense of localization of the directional speaker.

The directional speaker may output a masking sound. The directional speaker may include a first directional speaker having a sound emitting direction with respect to the acoustic blocker and disposed on an inner side surface of the first wall surface to which a target sound is outputted, and a second directional speaker disposed on an outer side surface of the first wall surface to which a masking sound is outputted. A resonance tube may be provided on the first wall surface. The directional speaker may include a speaker unit, an enclosure of the speaker unit to attach the speaker unit, and an aperture configuring a Helmholtz resonator, wherein a resonance frequency Fr of the Helmholtz resonator and a reproducible lower limit frequency Fmin of the speaker unit satisfy a formula (5). Formula (5): $Fr \geq Fmin$. A width A of the enclosure and a wavelength $\lambda$ of a sound wave corresponding to the resonance frequency Fr may satisfy a formula (6). Formula (6): $A \geq 0.25\lambda$. A width A of the enclosure and a wavelength $\lambda$ of a sound wave corresponding to the resonance frequency Fr may have a following relationship. $A \geq 0.5\lambda$. The aperture may be directed in a direction intersecting a sound emitting direction of the speaker unit and in a direction other than a direction opposite to the sound emitting direction, or the aperture may be directed in a same direction as a sound emitting direction of the speaker unit. The speaker unit may be a flat speaker. The sound emitting apparatus may include a resonance tube outside the enclosure. The sound emitting apparatus may include a sound absorbing material inside the enclosure. A part of the wall surface may be at least a portion of the enclosure.

What is claimed is:

1. A sound emitting apparatus comprising:

a speaker unit; and an enclosure of the speaker unit having an aperture configuring a Helmholtz resonator, wherein a resonance frequency Fr of a Helmholtz resonator is set to be equal to or higher than a reproducible lower limit frequency of the speaker unit, wherein a width A of the enclosure and a wavelength $\lambda$ of a sound wave corresponding to the resonance frequency Fr satisfy the following formula (C):

$$A \geq 0.5\lambda. \quad \text{(C).}$$

2. The sound emitting apparatus according to claim 1, wherein a volume V of the enclosure, an area S of the aperture, and a plate thickness L of the enclosure satisfy the following formula (A):

$$Fr=(c/2\pi)\cdot(S/VL)^{1/2}, \quad \text{(A)}$$

wherein c is a sound velocity.

3. The sound emitting apparatus according to claim 1, wherein the aperture is directed in a direction intersecting a sound emitting direction of the speaker unit and in a direction other than a direction opposite to the sound emitting direction.

4. The sound emitting apparatus according to claim 1, wherein the aperture is directed in a same direction as a sound emitting direction of the speaker unit.

5. The sound emitting apparatus according to claim 1, wherein the speaker unit is a flat speaker.

6. The sound emitting apparatus according to claim 1, further comprising a resonance tube outside the enclosure.

7. The sound emitting apparatus according to claim 1, further comprising a sound absorbing material inside the enclosure.

8. The sound emitting apparatus according to claim 7, wherein the resonance frequency Fr of the Helmholtz resonator is less than or equal to an effective lower limit frequency of the sound absorbing material.

9. The sound emitting apparatus according to claim 1, wherein the speaker unit and the enclosure are connected through a shock-absorbing material.

10. The sound emitting apparatus according to claim 1, further comprising a wall surface to dispose the enclosure.

11. The sound emitting apparatus according to claim 10, wherein a part of the wall surface forms at least a portion of the enclosure.

12. The sound emitting apparatus according to claim 10, further comprising:

a plate material including the wall surface; and an auxiliary tool to support the plate material and assist movement of the plate material.

13. A sound emitting apparatus comprising:

a speaker unit;

an enclosure of the speaker unit having an aperture configuring a Helmholtz resonator, wherein a resonance frequency Fr of a Helmholtz resonator is set to be equal to or higher than a reproducible lower limit frequency of the speaker unit; and a sound absorbing material inside the enclosure.

* * * * *